UNITED STATES PATENT OFFICE.

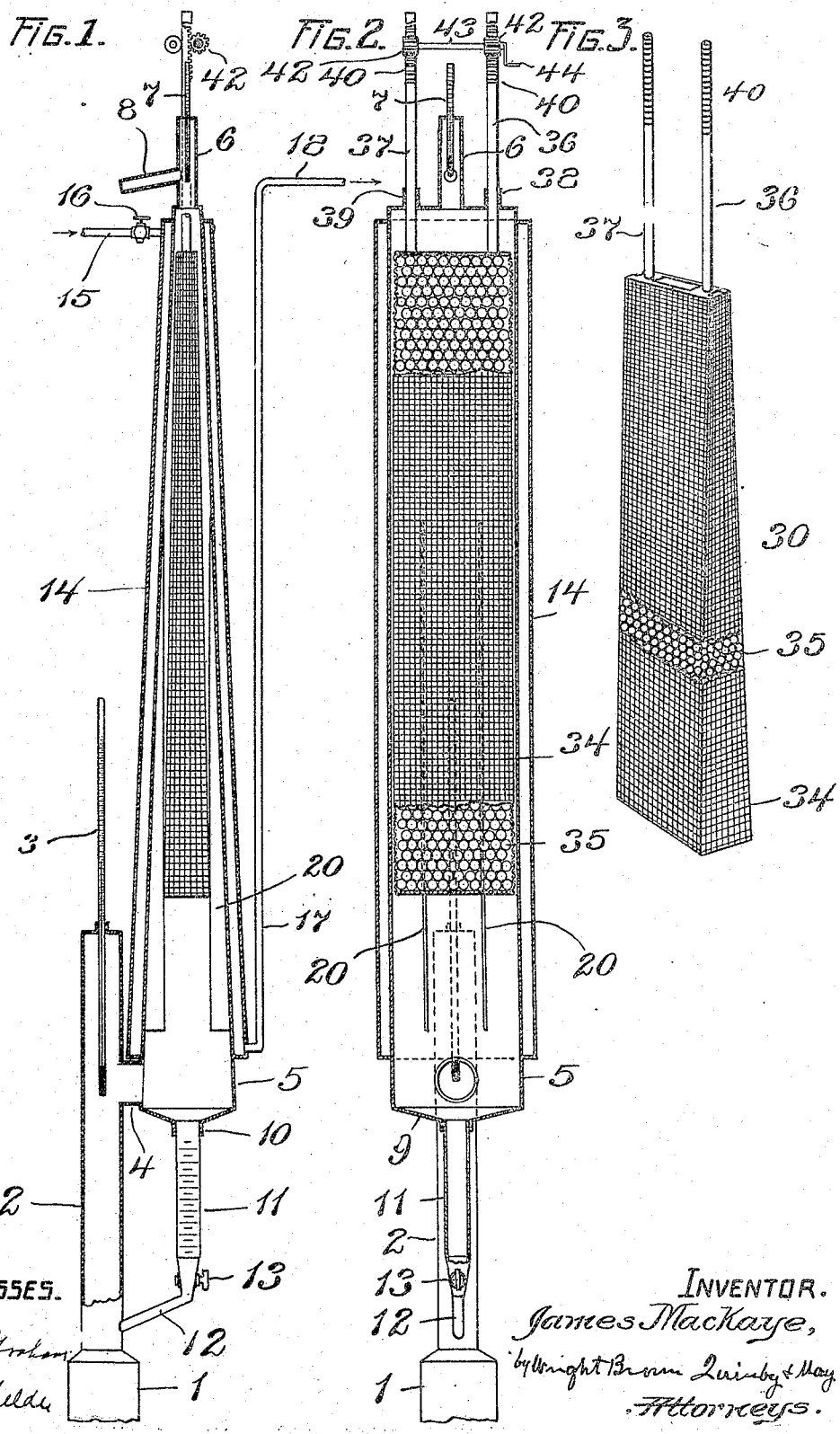

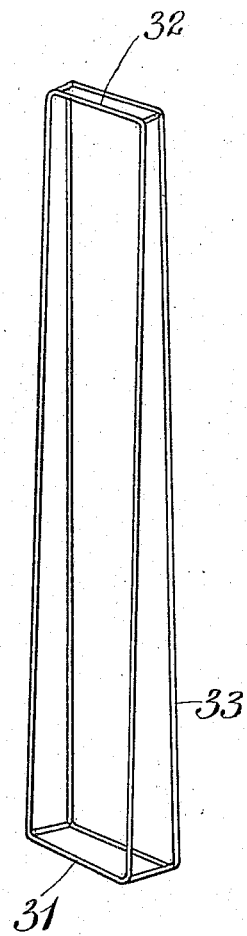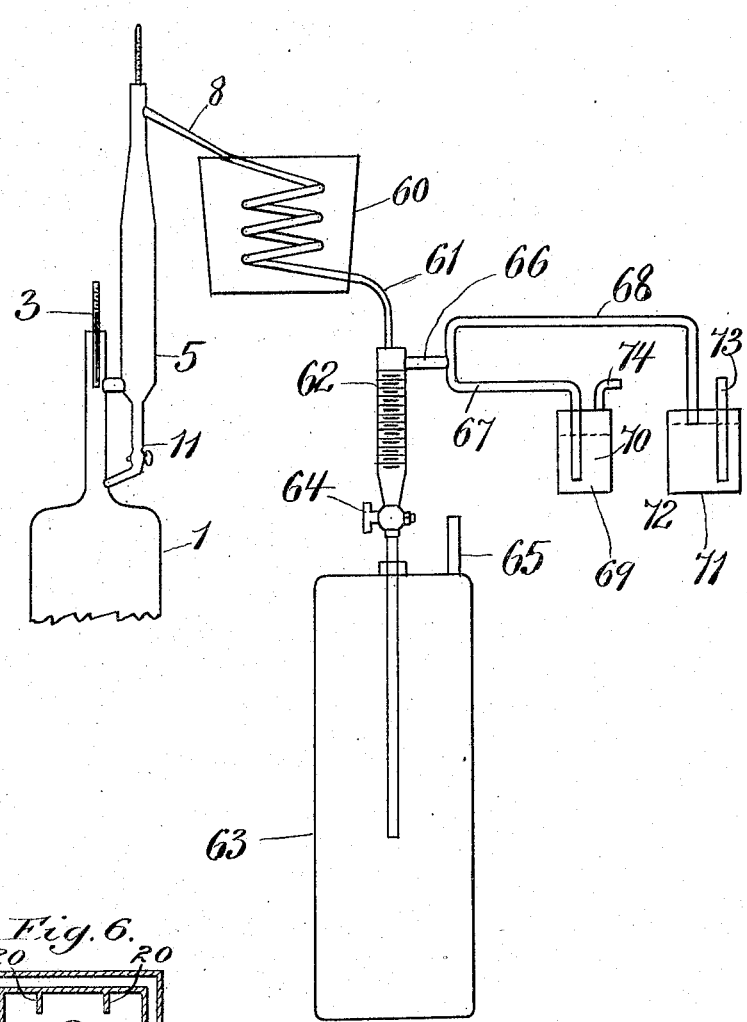

JAMES MacKAYE, OF CAMBRIDGE, MASSACHUSETTS, ASSIGNOR TO CHARLES A. STONE AND EDWIN S. WEBSTER, OF NEWTON, MASSACHUSETTS, AND RUSSELL ROBB, OF CONCORD, MASSACHUSETTS.

DEPHLEGMATOR.

No. 911,311.     Specification of Letters Patent.     Patented Feb. 2, 1909.

Application filed July 24, 1905. Serial No. 270,919.

*To all whom it may concern:*

Be it known that I, JAMES MacKAYE, of Cambridge, in the county of Middlesex and State of Massachusetts, have invented certain new and useful Improvements in Dephlegmators, of which the following is a specification.

My invention relates to an apparatus for fractional distillation.

Figure 1 is a vertical sectional view of a dephlegmator constructed in accordance with my invention, showing the parts of the apparatus in side elevation. Fig. 2 is a vertical sectional view of the same but showing the parts of the apparatus in front elevation. Fig. 3 is a detail perspective view of the adjustable cage and its contents that in the complete apparatus is arranged in the dephlegmating chamber proper. Fig. 4 is a detail perspective view of the framework of the cage. Fig. 5 is a diagrammatic view of my complete apparatus. Fig. 6 is a cross-sectional view of the column, taken on line 6—6 of Fig. 2.

The same reference characters indicate the same parts in all the figures.

1 represents the top of a still-head of any preferred type of construction. The still-head 1 as shown, is formed with an extension 2 into the top of which a thermometer 3 is inserted in any preferred manner. The extension 2 is formed with a laterally projecting pipe 4.

5 represents a dephlegmating chamber, the walls of which are composed of any suitable material. The chamber as shown, is rectangular in cross section and has the general shape of a truncated pyramid, the sides of which, however, if extended, would meet at a line at the top instead of at a point, the inclination being in the front and back walls of the chamber, the side and end walls of the chamber being parallel. The top of the chamber 5 is formed with an extension 6 into the top of which a thermometer 7 is inserted, the lower end of which extends down below the opening of a pipe 8 that leads from the extension 6 to a condenser of any preferred construction or type. The lower end of the chamber 5 is formed with downwardly-sloping walls 9 as shown, terminating in a nipple 10 in which is arranged a graduated glass tube 11. The lower end of this tube 11 is deflected as at 12 and arranged in a suitable aperture in the extension 2 so that the contents of the tube 11 can pass back into the extension 2 except when prevented by means of a valve 13. 14 represents a water-jacket arranged about the chamber 5 as shown. A pipe 15 from any suitable water supply communicates with the top of this chamber, the flow of water through the pipe 15 into the chamber being controlled by a valve 16.

17 represents a waste pipe running from the lower end of the water-jacket chamber. This pipe 17 as shown is carried in a vertical line above the top of the chamber 5 and then is deflected as at 18 to any desired point of discharge, the vertical section of the pipe serving to maintain the water-jacket chamber full at all times. The chamber 5 is connected to the extension 2 by means of the pipe 4, the cross section of the pipe being sufficient to permit the free flow of gases from the extension 2 into the chamber.

20, 20, 20, 20 represent two pairs of guides, there being one pair of said guides 20 upon each of the inclined walls of the chamber 5, to wit: the front and the back walls in the form shown. These guides as shown, are wedge-shaped with the butt of the wedge toward the bottom of the chamber, the edge of the wedge toward the top of the chamber 5. Inside of the chamber 5 is arranged a general wedge-shaped cage 30. The cage has the general shape of the chamber 5 except that it is less in cross section and shorter. Further the front and rear walls of the cage have less inclination than the corresponding walls of the chamber. The cage 30 is made up of a bottom rectangular frame 31 and a complemental top rectangular frame 32 connected together by four side bars 33. The sides of the cage are composed of wire fabric 34. The chamber formed by the fabric 34 is filled with beads 35 of any suitable material, the mesh of the fabric 34 being sufficient to retain the beads in the chamber. To the top framework 32 are secured two rods 36, 37, arranged in complemental stuffing boxes 38, 39, formed in the top of the chamber 5. The tops of these rods 36, 37 may be formed with rack teeth 40 to engage with pinions 42 carried by a shaft 43 operated by a crank 44. By this means the cage 30 may be adjusted to any desired height within the chamber 5. I have shown a rack and gear for effecting this adjustment, but any desired means may be employed for this purpose.

The guides 20 prevent undue lateral motion of the cage in its several positions, the inner walls of the guides being parallel and spaced apart sufficiently to permit the vertical movement of the lower end of the cage, yet close enough to prevent undue lateral motion of the same, these guides therefore maintain the cage centrally in the chamber 5.

While my improved dephlegmator may be used for distilling a single liquid, it has no special features of advantage for that purpose, it being particularly designed for fractional distillation, that is to say, where it is desired to separate one liquid from another in those combinations where the two liquids have different boiling points. Assuming the mixed vapors coming up into the still-head 1, they pass through the extension 2 and pipe 4 into the bottom of the chamber 5, from which point the vapors are compelled to either pass through the beads 35 or contents of the cage 30 or else through the narrow space between the cage and the walls of the chamber 5, the uncondensed vapor at the top of the chamber passing by way of the pipe 8 to a condensing apparatus of any desired construction. The end of the thermometer 3, being in front of the pipe 4 or entrance, and the end of the thermometer 7 being in front of the pipe 8 or outlet, I am able to ascertain readily the temperature at both points at any time. During the passage of the vapors through the chamber, the vapor of lower condensing point will be condensed either upon the beads or in the space between the cage and the walls of the chamber, so that on the beads, among the beads and in the space between the cage and the walls of the chamber there will always exist a certain amount of condensed vapor. It follows from this that the ascending uncondensed vapors in passing among the beads and between the walls of the cage and the chamber, are compelled to pass through the liquid formed by the condensation of the vapor previously vaporized, as above stated. It is, of course, understood that the vapor of both liquids will condense, but the vapor of the liquid having the higher boiling point condenses in greater relative proportion, the relative proportion depending upon the vapor tension of the two liquids. Thus during the operation of the apparatus the vapor is not only condensed, but the ascending vapor is compelled to pass through the liquid of condensation before it can escape or pass out of the apparatus by way of the pipe 8, it being understood of course that the space between the cage and walls of the chamber is so small as to insure the formation of liquid of condensation in this passage or space through which the ascending vapor must pass. If this rate of flow of vapor through the pipe 4 into the bottom of the chamber is so rapid as to carry not only the vapor but the liquid of condensation over through the cage and through the pipe 8, in other words, to bring about the condition that may be called "geysering", the cage 30 is then lowered, thereby increasing the space between the cage and the walls of the chamber, and such adjustment is continued until sufficient space is provided to prevent this undesirable action.

The beads in the cage serve as an extremely efficient means to condense the vapor and at the same time hold the liquid of condensation to permit the passage of the ascending vapor therethrough, said liquid as it accumulates running back through the chamber and the tube 11 to the still-head. In practice the cage is adjusted to the point suitable for the handling of the particular mixture to be distilled and requires only infrequent adjustment. The cage serves two purposes, one, that of condensation by reason of the beads, and the other, the maintenance of continuous distillation by the capacity to prevent "geysering" through the vertical adjustment of the cage.

The relative proportion of the vapor in the chamber grows less toward the top of the chamber, that is to say, as the vapor ascends it is more and more condensed. Further by reason of having relatively narrow end walls, and relatively wide front and rear walls, and by reason of the inclination of the latter, I provide a condensing surface of relatively large area, to wit: substantially the whole area of the chamber. The relative proportion of inclined surface of the dephlegmator chamber to the vertical or end surface can be varied as desired.

Referring to Fig. 5, the pipe 8 of the dephlegmator above described leads to a condenser 60 of any preferred type. The outlet pipe 61 of the condenser 60 leads into the top of the graduated glass tube 62 that empties into a tank or other receptacle 63. The stop-cock 64 and the tube 62 serve as means for holding in the tube temporarily the "distillates" for the purpose of measuring them in the same way in which the "cohobates" are held and measured in the tube 11. 65 represents a vent pipe for the chamber 63. 66 represents a pipe connected to the top of tube 62 and formed with two communicating branches, 67, 68, the end of the branch 67 terminating in a closed jar 69 below the level 70 of the liquid therein; while the branch 68 terminates in a closed jar 71 above the level 72 of the liquid therein. 73 represents a tube running from the bottom of the liquid in the jar 71 to the air. 74 is a tube opening into the top of the jar 70 above the level of the liquid. The pipes, 67, 68, and their connections serve to maintain a practically uniform pressure in the tube 62.

By closing the cocks 64 and 13, and watching the graduations on the glasses 11 and 62, I am able to determine, by the reading of said glasses, the relative porportion of "distillate" and "cohobates" produced during any given period. If the relative proportion of "distillate" being produced is too great, I can control and reduce such proportion to any desired amount, by opening sufficiently the cock 16 of the water circulation; whereas, if the relative proportion of "distillate" be too low, I can increase such proportion to any desired amount by a sufficient closing movement of the cock 16. The graduating glasses 62 and 11 furnish means for indicating the relative amount of "distillate" and "cohobates" being produced, while the water circulation and its controlling member or cock 16, serves as a means for controlling or regulating the amount of "distillate and cohobates" produced, the term "distillate" designating the products carried over to the pipe 8 to the condenser 60, while the term "cohobates" designates the products of distillation that run back through the tube 11 into the still.

In the use of applicant's apparatus the proportions are varied according to the particular article to be treated and the desired capacity for production. Apart from such proportions, no special construction is required for each individual use, since, by the adjustment of the cage, the same apparatus may be used for the distillation of vapors of different substances, the proportions in which the apparatus should be constructed being clearly shown in the drawings, the constructor of the apparatus making the size of the apparatus correspond with the quantity of distillation required. It will be obvious that by the adjustability of the cage, the latter may be positioned at such a point in any particular case that the vapor will be compelled to travel up among the beads, as well as around the sides of the cage, the space between the cage and the wall of the frame being varied as desired, by the adjustment of the cage to a point where "geysering" will be prevented. In the use of the apparatus the space between the cage and the sides does not become clogged. If for any reason such clogging action occurs, it is obviated by moving the cage to a point where such clogging will not take place. The operative position, or position of use, or position, in other words, between clogging and "geysering", must be ascertained by the operator in each case.

Applicant's apparatus provides means whereby the operator can readily hold the action of the apparatus in its operative zone, between "clogging" and "geysering", thus enabling the desired results to be secured continuously and effectively. It is manifest that while one position of the cage might do for several different substances, yet, the capacity of the construction shown and described enables the distillation to be carried on in the apparatus without "geysering" and without "clogging", whatever substances may be employed, since the cage, as above stated, can be adjusted to a point which permits the desired distillation without the interference of "clogging" or "geysering".

Having thus explained the nature of my invention and described a way of making and using the same, although without attempting to set forth all of the forms in which it may be made or all of the modes of its use, what I claim and desire to secure by Letters Patent is—

1. A dephlegmator comprising a wedge-shaped chamber, a wedge-shaped condensing material-containing receptacle arranged within the former, and means for vertically moving the receptacle so as to vary the distance between its walls and the walls of the chamber, to vary the area of the cross-section of the free space between the said receptacle and said chamber.

2. A dephlegmator comprising a wedge-shaped chamber, formed with an inlet and an outlet, a wedge-shaped condensing material-containing receptacle arranged within the former, means for vertically moving the receptacle so as to vary the distance between its walls and the walls of the chamber, to vary the area of the cross-section of the free space between the said receptacle and said chamber, a still head connected to said inlet, a condenser connected to said outlet, means for visually measuring the flow of material through said outlet, a separate pipe connecting the bottom of said chamber with said still, having provisions to permit the visual measuring of the cohobates passing therethrough.

3. A dephlegmator comprising a wedge-shaped chamber, formed with an inlet and an outlet, a wedge-shaped condensing material-containing receptacle arranged within the former, and means for vertically moving the receptacle so as to vary the distance between its walls and the walls of the chamber, to vary the area of the cross-section of the free space between the said receptacle and said chamber, a still head connected to said inlet, a separate visual measuring connection between said still head and the bottom of said chamber, a condenser connected with said outlet formed with visual measuring means, and a water jacket arranged about said chamber.

4. A dephlegmator comprising a chamber having inclined walls, a complemental shaped condensing material-containing receptacle arranged within the former, and means for vertically moving the receptacle so as to vary the distance between its walls and the walls of the chamber, to vary the area of the cross-section of the free space between the said receptacle and the said chamber.

5. A dephlegmator comprising a chamber having inclined walls, a complemental shaped condensing material-containing receptacle arranged within the former, means for vertically moving the receptacle so as to vary the distance between its walls and the walls of the chamber, to vary the area of the cross-section of the free space between the said receptacle and the said chamber, and means for indicating the rate of production of "cohobate".

6. A dephlegmator comprising a chamber having inclined walls, a complemental shaped condensing material-containing receptacle arranged within the former, means for vertically moving the receptacle so as to vary the distance between its walls and the walls of the chamber, to vary the area of the cross-section of the free space between the said receptacle and the said chamber, and means for indicating the relative rate of production of distillate and cohobate.

In testimony whereof I have affixed my signature, in presence of two witnesses.

JAMES MacKAYE.

Witnesses:
WILLIAM QUINBY.
E. T. GRAHAM.